US008582478B2

(12) United States Patent
He (10) Patent No.: US 8,582,478 B2
(45) Date of Patent: Nov. 12, 2013

(54) SINGLE ANTENNA, MULTI-BAND FREQUENCY DIVISION MULTIPLEXED MOBILE COMMUNICATION (75) Inventor: Xiaoyin He, San Diego, CA (US)

(73) Assignee: QUALCOMM, Incorporated, San Diego, CA (US)

(*) Notice: Subject to any disclaimer, the term of this patent is extended or adjusted under 35 U.S.C. 154(b) by 245 days.

(21) Appl. No.: 13/070,287

(22) Filed: Mar. 23, 2011

(65) Prior Publication Data
US 2012/0243449 A1 Sep. 27, 2012

(51) Int. Cl.
*H04L 1/02* (2006.01)
*H04L 5/14* (2006.01)

(52) U.S. Cl.
USPC .......................................... 370/281; 370/343

(58) Field of Classification Search
USPC .......................................... 370/281, 297, 343
See application file for complete search history.

(56) References Cited

U.S. PATENT DOCUMENTS

| 5,815,804 | A * | 9/1998 | Newell et al. ............... 455/78 |
| 2004/0209583 | A1 | 10/2004 | Forrester et al. |
| 2005/0164888 | A1* | 7/2005 | Hey-Shipton ............... 505/210 |
| 2008/0101263 | A1* | 5/2008 | Barber et al. ............... 370/282 |
| 2008/0174470 | A1* | 7/2008 | Lum et al. ............... 342/16 |
| 2009/0233642 | A1 | 9/2009 | Zhitnitsky |
| 2010/0231324 | A1* | 9/2010 | Lee et al. ............... 333/135 |

FOREIGN PATENT DOCUMENTS

EP 0829915 A2 3/1998

OTHER PUBLICATIONS

Ericsson: "Feasibility for support of different bands for Dual-Cell HDSPA", 3GPP Draft; R4-091271_Dual_CellBands, 3rd Generation Partnership Project T3GPP), Mobile Competence Centre; 650, Route Des Lucioles; F-06921 Sophia-Antipolis Cedex; France, no. Seoul, Korea; Mar. 30, 2009, XP050342046, [retrieved on Mar. 30, 2009].
International Search Report and Written Opinion—PCT/US2012/030471, International Search Authority—European Patent Office, May 23, 2012.

* cited by examiner

*Primary Examiner* — Brian D Nguyen
(74) *Attorney, Agent, or Firm* — William M. Hooks (57) ABSTRACT A frequency division (FD) multiplexing device includes a multiplexer including a band-pass and a band-stop filter, the multiplexer is communicatively coupled to an antenna, the band-pass filter is configured to allow pass band frequencies to pass un-attenuated and to attenuate signals outside of the pass band. The band-stop filter is configured to attenuate signals at frequencies in at least a portion of the pass-band and allow frequencies outside the pass-band to pass un-attenuated. The multiplexing device further includes filters communicatively coupled to the multiplexer to receive first and second receive signals in first and second receive bands, where the first and second receive filters attenuate signals at frequencies outside of the first and second receive bands, respectively, and first and second transmit filters attenuate signals at frequencies outside a first transmit band and signals at frequencies outside a second transmit band, and couple the first and second filtered transmit signals to the multiplexer such that the first and second transmit signals are transmitted via the antenna. At least one of the first receive band and the first transmit band are located in the pass-band and intermingled between the second receive band and the second transmit band.

25 Claims, 7 Drawing Sheets

SINGLE ANTENNA, MULTI-BAND FREQUENCY DIVISION MULTIPLEXED MOBILE COMMUNICATION

BACKGROUND

Wireless communication systems offer many types of services including voice, data, video, broadband and others. In addition, wireless communications offer services in differing geographic ranges including personal area networks (PAN), local area networks (LAN), wide area networks (WAN), metropolitan area networks (MAN), cellular networks, satellite communications networks, etc.

The different types of services and different types of geographic coverage perform differently in different frequency bands. In order to provide for these different services and coverage areas, a multitude of frequency bands have been established. As wireless communications have flourished, the frequency bands have become more crowded and in many cases intermingled in complicated fashions.

With the proliferation of services offered through the various ranges of wireless technologies, consumer demands for ubiquitous wireless services of all types has prompted manufacturers to include multiple types of radios in a single device. Different radios operating over different frequency spectrums in a single device has often required multiple antennas in a single device, which is not necessarily cost effective or esthetically pleasing.

Devices such as duplexers, radio frequency (RF) switches and the like have be used to enable multiple radios to transmit and receive over a single antenna. However, with the proliferation of different frequency bands over wider ranges of frequencies, and with more intermingling of the frequency bands, use of a single antenna for multiple radios in a single device has become much more difficult. Duplexers operable to isolate multiple widely separated and/or intermingled frequency bands can be prohibitively expensive or unfeasible.

SUMMARY

A frequency division multiplexing device which enables simultaneous communication with two transceivers via a single antenna is described herein. The multiplexing device can provide for simultaneous frequency division multiplexed communication with a single antenna for intermingled frequency bands. Intermingled frequency bands include where a first receive band and/or a first transmit band associated with a first transceiver is located between second receive and transmit bands associated with a second transceiver.

An example of a frequency division (FD) multiplexing device includes a multiplexer comprising a band-pass filter and a band-stop filter. The multiplexer is configured to be communicatively coupled to an antenna. The band-pass filter is configured to allow signals at frequencies in a pass-band to pass un-attenuated and to attenuate signals at frequencies outside of the pass-band and the band-stop filter is configured to attenuate signals at frequencies in at least a portion of the pass-band and to allow frequencies outside of the pass-band to pass un-attenuated. The multiplexing device also includes first and second receive filters communicatively coupled to the multiplexer to receive a first receive signal in a first receive band and receive a second receive signal in a second receive band different than the first receive band. The first and second receive filters are configured to attenuate signals at frequencies outside of the first and second receive bands, respectively. The multiplexing device further includes first and second transmit filters communicatively coupled to the multiplexer and configured to filter a first transmit signal in a first transmit band to attenuate signals at frequencies outside of the first transmit band, and to filter a second transmit signal in a second transmit band different than the first transmit band to attenuate signals at frequencies outside of the second transmit band, and to couple the first and second filtered transmit signals to the multiplexer such that the first and second transmit signals will be transmitted via the antenna. At least one of the first receive band and the first transmit band are located in the pass-band and intermingled between the second receive band and the second transmit band.

Embodiments of such an FD multiplexing device may include one or more of the following features. The first transmit filter and the first receive filter can be included in a duplexer. The first receive band and the first transmit band can be within the pass-band of the band-pass filter of the multiplexer. The multiplexing device can further include first and second transmitters communicatively coupled to the first and second transmit filters, the first and second transmitters being configured to couple the first and second transmit signals to the first and second transmit filters, respectively. The multiplexing device can further include first and second receivers communicatively coupled to the first and second receive filters, the first and second receivers being configured to receive the first and second filtered receive signals from the first and second receive filters, respectively. The multiplexing device can further include an FD diplexer coupled to a spatial diversity antenna spaced apart from the antenna; and third and fourth receive filters coupled to the FD diplexer, the third and fourth receive filters configured to receive spatially diverse versions of the first and second receive signals received from the spatial diversity antenna, attenuate signals at frequencies outside of the first and second receive bands, respectively, and couple the filtered spatially diverse versions of the first and second receive signals to the first and second receivers, respectively. The first and second receive filters and the first and second transmit filters can be band-pass filters.

An example of a method of frequency division (FD) multiplexing includes receiving a composite signal via a first input, the first input being configured to be communicatively coupled to an antenna; filtering a first transmit signal in a first transmit band to attenuate signals at frequencies outside of the first transmit band; filtering a second transmit signal in a second transmit band different than the first transmit band to attenuate signals at frequencies outside of the second transmit band; and coupling the composite signal and the first and second filtered transmit signals to a multiplexer. The method further includes multiplexer-filtering the composite signal and the first and second filtered transmit signals with the multiplexer, the multiplexer-filtering including band-pass filtering to allow frequencies in a pass band to pass un-attenuated and to attenuate signals at frequencies outside of the pass-band, and band-stop filtering to attenuate signals at frequencies in at least a portion of the pass-band and to allow frequencies outside of the pass-band to pass un-attenuated. The method further includes coupling the multiplexer-filtered first and second transmit signals to an output such that the first and second transmit signals will be transmitted via the antenna; coupling a first portion of the multiplexer filtered composite signal to a first receive filter, the first portion comprising a first receive signal in a first receive band, the first receive filter configured to attenuate signals at frequencies outside of the first receive band; and coupling a second portion of the multiplexer filtered composite signal to a second receive filter, the second portion comprising a second receive signal in a second receive band different than the first receive band, the second receive filter configured to attenuate signals at frequencies outside of the second receive band. At least one of the first receive band and the first transmit band are located in the pass-band and intermingled between the second receive band and the second transmit band.

Embodiments of such a method of FD multiplexing may include one or more of the following features. The first transmit filter and the first receive filter can be included in a duplexer. The first receive band and the first transmit band can be within the pass-band. The method can further include receiving the first transmit signal with the first transmit filter from a first transmitter; receiving the second transmit signal with the second transmit filter from a second transmitter distinct from the first transmitter; coupling the first receive signal from the first receive filter to a first receiver after filtering with the first receive filter; and coupling the second receive signal from the second receive filter to a second receiver after filtering with the second receive filter. The method can further include receiving another composite signal via a second input, the second input being configured to be communicatively coupled to a spatial diversity antenna spaced apart from the antenna; coupling the another composite signal to an FD diplexer, the FD diplexer including third and fourth receive filters; filtering the another composite signal with the third and fourth receive filters to attenuate signals at frequencies outside of the first and second receive bands, respectively; and coupling the filtered signals in the first and second receive bands to the first and second receivers, respectively. The first and second receive filters and the first and second transmit filters can be band-pass filters. The method can further include filtering the first portion with the first receive filter; and filtering the second portion with the second receive filter.

An example of an apparatus for frequency division (FD) multiplexing includes means for receiving a signal from an antenna; first transmit filter means for filtering a first transmit signal in a first transmit band to attenuate signals at frequencies outside of the first transmit band; second transmit filter means for filtering a second transmit signal in a second transmit band different than the first transmit band to attenuate signals at frequencies outside of the second transmit band; and multiplexing filter means for filtering a composite signal received from the antenna, and for filtering the first and second filtered transmit signals such that the first and second transmit signals will be transmitted via the antenna. The multiplexing filter means includes band-pass filter means for allowing frequencies in a pass band to pass un-attenuated and for attenuating frequencies outside of the pass-band, and band-stop filter means for attenuating frequencies in at least a portion of the pass-band and to allow frequencies outside of the pass-band to pass un-attenuated. The apparatus for FD multiplexing further includes first receive filter means for filtering a first portion of the multiplexing filtered composite signal, the first portion comprising a first receive signal in a first receive band, the first receive filter means configured to attenuate signals at frequencies outside of the first receive band; and second receive filter means for filtering a second portion of the multiplexing filtered composite signal, the second portion comprising a second receive signal in a second receive band different than the first receive band, the second receive filter means configured to attenuate signals at frequencies outside of the second receive band. At least one of the first receive band and the first transmit band are located in the pass-band and intermingled between the second receive band and the second transmit band.

Embodiments of such an apparatus for FD multiplexing may include one or more of the following features. The receiving means can be an input. Each of the first and second transmit filter means can be a band-pass filter, a low-pass filter or a high-pass filter. The multiplexing filter means can be a triplexer. Each of the first and second receive filter means can be a band-pass filter, a low-pass filter or a high-pass filter. The first and second receive filter means can couple the first and second portions to first and second receivers, respectively, and the apparatus can further include: means for receiving another composite signal via a spatial diversity antenna spaced apart from the antenna; means for filtering the another composite signal to attenuate signals at frequencies outside of the first and second receive bands; and means for coupling the filtered signals in the first and second receive bands to the first and second receivers, respectively.

An exemplary computer program product includes a processor-readable medium storing processor-readable instructions configured to cause a processor to: receive a composite signal; filter a first transmit signal in a first transmit band to attenuate signals at frequencies outside of the first transmit band; filter a second transmit signal in a second transmit band different than the first transmit band to attenuate signals at frequencies outside of the second transmit band; and multiplexer-filter the composite signal and the first and second filtered transmit signals with a multiplexer. The processor-readable instructions are configured to cause the multiplexer to: band-pass filter to allow signals at frequencies of a pass band to pass un-attenuated and to attenuate signals at frequencies outside of the pass-band, and band-stop filter to attenuate signals at frequencies in at least a portion of the stop-band and to allow signals at frequencies outside of the stop-band to pass un-attenuated; convey the multiplexer-filtered first and second transmit signals to an output such that the first and second transmit signals will be transmitted via the antenna; convey a first portion of the multiplexer filtered composite signal to a first receive filter, the first portion comprising a first receive signal in a first receive band, the first receive filter configured to attenuate signals at frequencies outside of the first receive band; and convey a second portion of the multiplexer filtered composite signal to a second receive filter, the second portion comprising a second receive signal in a second receive band different than the first receive band, the second receive filter configured to attenuate signals at frequencies outside of the second receive band. At least one of the first receive band and the first transmit band are located in the pass-band and intermingled between the second receive band and the second transmit band.

Embodiments of such a computer program product may include one or more of the following features. The first receive band and the first transmit band can be within the pass-band of multiplexer. The instructions can be configured to cause the processor to: receive the first transmit signal from a first transmitter; receive the second transmit signal from a second transmitter distinct from the first transmitter; convey the first receive signal to a first receiver after filtering with the first receive filter; and convey the second receive signal from the second receive filter to a second receiver after filtering with the second receive filter. The instructions can be configured to cause the processor to: receive a spatially diverse composite signal corresponding to the composite signal; filter the spatially diverse composite signal with third and fourth receive filters to attenuate frequencies outside of the first and second receive bands; and convey the filtered spatially diverse signals in the first and second receive bands to the first and second receivers, respectively. The first and second receive filters and the first and second transmit filters can be band-pass filters. The instructions can be configured to cause the processor to: filter the first portion with the first receive filter; and filter the second portion with the second receive filter.

Items and/or techniques of the disclosure may provide one or more of the following capabilities. Less expensive multiplexers, e.g., triplexers, in combination with low cost transmit and receive filters can be used instead of high cost duplexers. A single antenna can be used for multiplexed multi-band mobile communication and, in devices with antenna diversity, two spatially diverse antennas can be used instead of four antennas.

DETAILED DESCRIPTION OF EMBODIMENTS

A frequency division (FD) multiplexing device for simultaneously transmitting and receiving intermingled frequency bands via a single antenna is provided. The FD multiplexing device includes a multiplexer, such as a triplexer. The multiplexer is communicatively coupled to an antenna for receiving a composite receive signal. The multiplexer includes an band-pass filter configured to allow signals at frequencies in a pass-band to pass un-attenuated and to attenuate signals at frequencies outside of the pass band. The multiplexer also includes a band-stop filter configured to attenuate signals at frequencies in at least a portion of the pass-band and to allow signals at frequencies outside of the pass-band to pass un-attenuated. The multiplexing device includes first and second receive filters communicatively coupled to the multiplexer to receive a first receive signal in a first receive band and receive a second receive signal in a second receive band. The first and second receive filters are configured to attenuate signals at frequencies outside of the first and second receive bands, respectively. The multiplexing device further includes first and second transmit filters communicatively coupled to the multiplexer. The first transmit filter filters a first transmit signal in a first transmit band to attenuate signals at frequencies outside of the first transmit band. The second transmit signal filters a second transmit signal in a second transmit band, different than the first transmit band, to attenuate signals at frequencies outside of the second transmit band. The filtered transmit signals are conveyed to the multiplexer such that the first and second transmit signals will be transmitted via the antenna. The multiplexer, the receive filters and the transmit filters are configured to enable the FD multiplexing device to simultaneously transmit and receive the signals in the intermingled frequency bands via the single antenna.

A mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals.

The term "mobile station" also includes devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" includes all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above is also a "mobile station."

Figure 1:
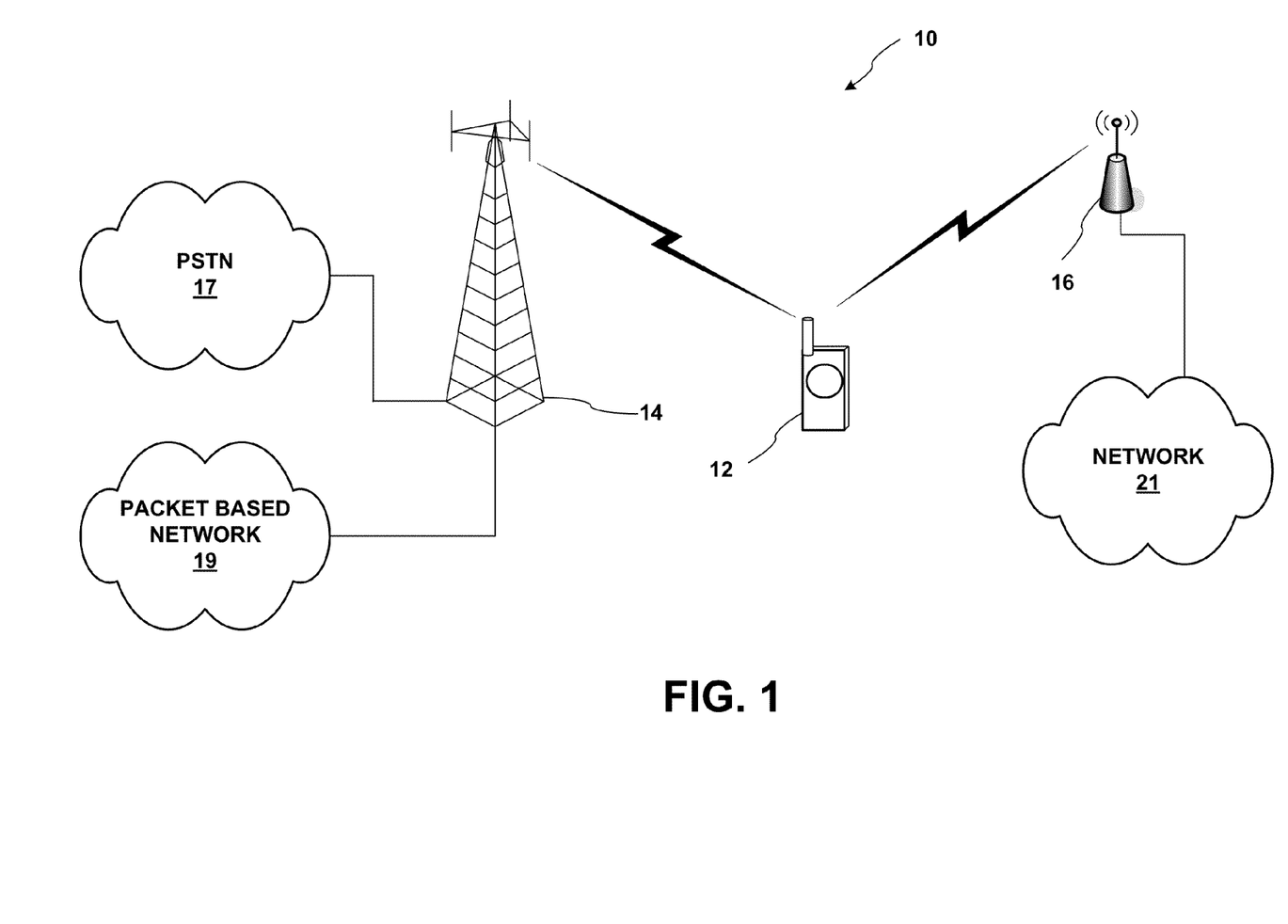
FIG. 1 is a simplified functional block diagram of a mobile station simultaneously communicating with multiple wireless networks.

Referring to FIG. 1, a simplified functional block diagram of an embodiment of a wireless network 10 includes a mobile station 12 configured to simultaneously communicate with multiple wireless networks represented by a base station 14 and a wireless access point 16. The base station 14 can be part of a cellular network. The base station 14 is communicatively coupled with a telephone network 17 (e.g., a public switched telephone network) and a packet based network (e.g., the Internet) 19. The wireless access point 16 can be part of a wireless LAN, MAN, WAN or other wireless network. The wireless access point 16 is communicatively coupled with a digital network 21.

Figure 2:
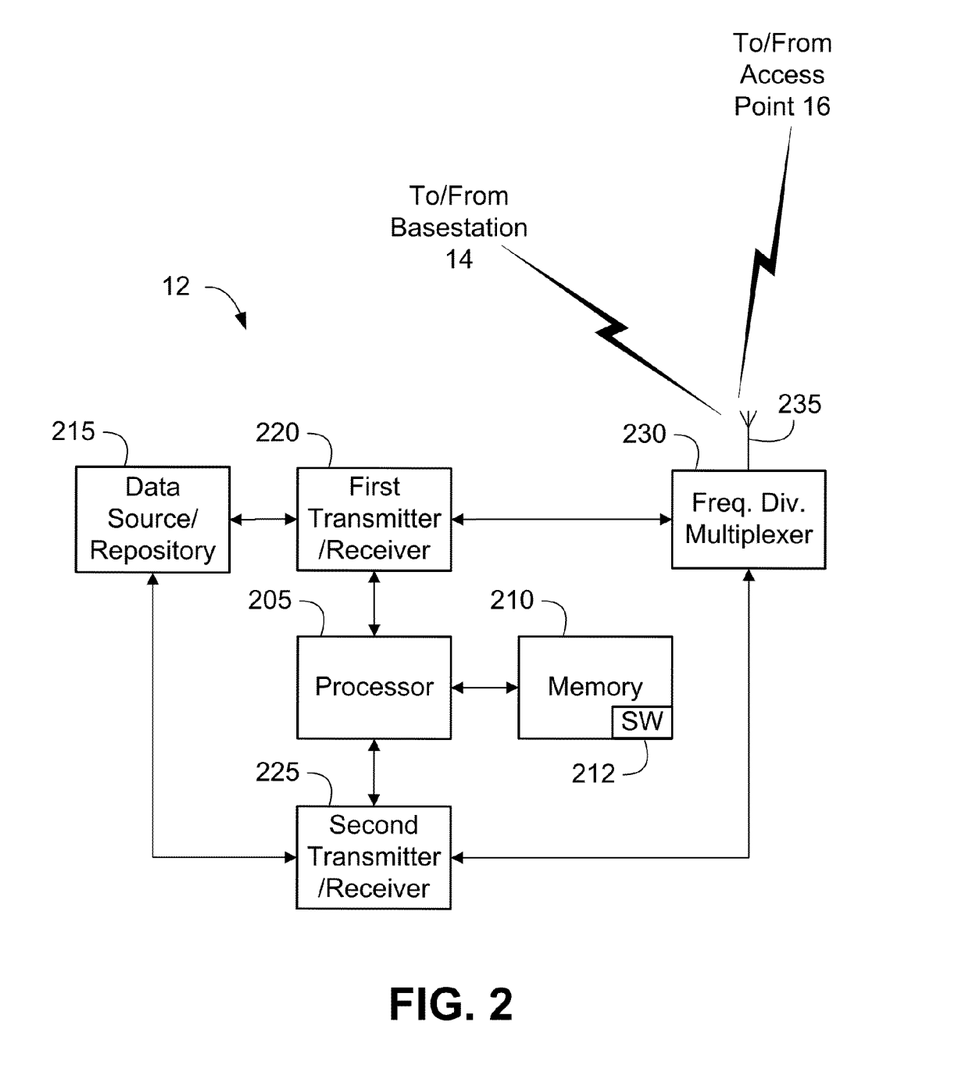
FIG. 2 is a simplified functional block diagram of a mobile station with a frequency division multiplexing device.

Referring to FIG. 2, an embodiment of a mobile station 12 includes the functional blocks shown. The mobile station includes a processor 205 and memory 210. The memory 210 includes random access memory (RAM) and read-only memory (ROM). The memory 210 stores a non-transitory computer program product comprising processor-readable, processor-executable software code 212 containing instructions that are configured to, when executed, cause the processor 205 to perform various functions described herein. Alternatively, the software may not be directly executable by the processor 205 but configured to cause the processor 205, e.g., when the instructions are compiled and executed, to perform functions described. The processor 205 is coupled to a first transceiver 220 (including a first transmitter and a first receiver) and a second transceiver 225 (including a second transmitter and a second receiver). The processor 205 is configured to cause the first and second transceivers 220 and 225, respectively, to simultaneously modulate and demodulate data transmitted to and received from a frequency division (FD) multiplexer 230 and a single antenna 235. Data to be transmitted is received from a data source/repository 215. Received data is communicated to the data source/repository 215 to be stored in memory or displayed in one or more ways (e.g., audibly, graphically, etc.).

The FD multiplexer 230 is configured to provide simultaneous FD duplexing of transmit and receive signals in first and second transmit bands and in first and second receiver frequency bands. The first receive and transmit bands can be mobile wireless bands for communicating with the base station 14. Mobile wireless bands can include frequencies in the personal communications service (PCS) band. The PCS band uses frequencies in two segments: an uplink (from mobile station to base station) from 1850 MHz to 1910 MHz, and a downlink (from base station to mobile station) from 1930 MHz to 1990 MHz. The second receive and transmit bands can be in the Advanced Wireless Services or AWS band. The AWS band uses frequencies in two segments: an uplink band from 1710 MHz to 1755 MHz, and a downlink band from 2110 MHz to 2155 MHz. Because the PCS frequency bands are straddled by the AWS frequency bands, the frequency bands are said to be intermingled. Intermingled frequency bands that are close together like PCS and AWS bands are difficult to transmit/receive via a single antenna, and two antennas are typically used. However, embodiments described herein use the single antenna 235 with closely spaced intermingled frequency bands.

Figure 3:
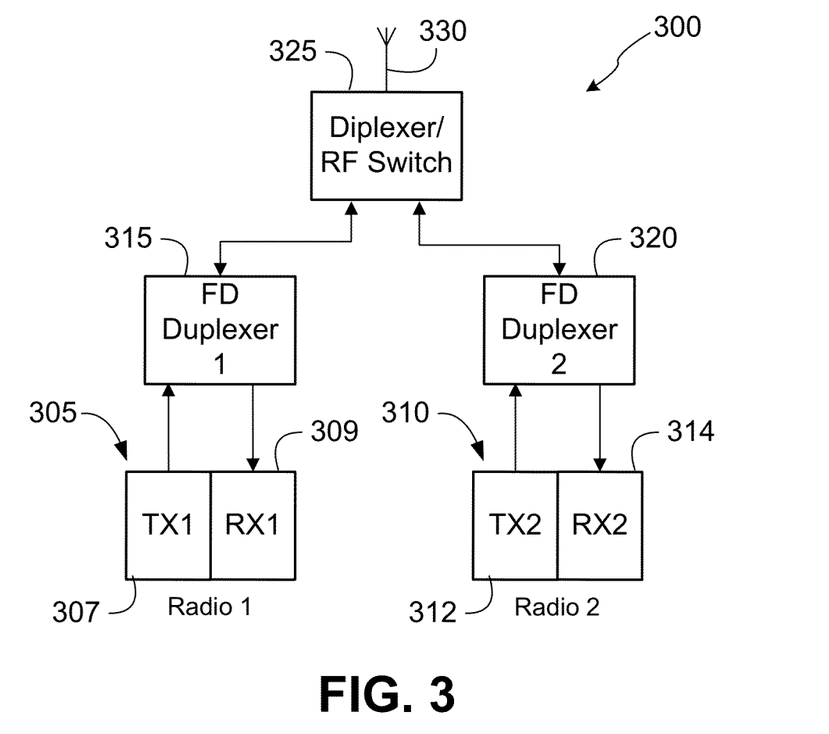
FIG. 3 is a simplified functional block diagram of a frequency division multiplexing device.

Referring to FIG. 3, FD multiplexing device 300, for use with non-intermingled frequency bands, includes two radios including a first radio 305 and a second radio 310, two FD duplexer filters 315 and 320 and a diplexer 325. Components 305, 310, 315, 320 and 325 of the multiplexing device 300 may include software executed by a processor, firmware, hardware (including manual controls), fixed logic circuitry or any combination thereof.

The first radio 305 includes a first transmitter 307 and a first receiver 309 communicatively coupled to the first duplexer 315. The second radio 310 includes a second transmitter 312 and a second receiver 314 communicatively coupled to the second duplexer 320. The transmitters 307 and 312 provide modulated signals to be transmitted to the duplexers 315 and 320, respectively, and the receivers 309 and 314 receive incoming modulated signals from the duplexers 315 and 320, respectively.

The first radio 305 transmits signals on a first uplink or UL band and receives signals on a first downlink or DL band. The second radio 310 transmits signals on a second UL band and receives signals on a second DL band. The first and second UL and DL bands are different frequency bands, e.g., the first radio can use the cellular band from 824 MHz to 894 MHz), and the second radio 310 can use the PCS band from 1850 MHz to 1990 MHz. The cellular and PCS frequency ranges are not intermingled. The first duplexer 315 can use band-pass filters centered at the first UL and DL frequencies located in the cellular band and the second duplexer 320 can use band-pass filters centered at the second UL and DL frequencies. Duplexers can use filters that use thin-film bulk acoustic resonator (FBAR) and/or surface acoustic wave (SAW) technologies. Rejection parameters for isolation of transmit and receive signals typically fall in a range from about 50 dB to about 60 dB, but can be from about 20 dB to about 100 dB.

The diplexer 325 is used to couple the signals to and from the first and second radios 305 and 310 to the antenna 330. The diplexer 325 could be replaced with an RF switch and used for monoplex transmit/receive. The diplexer 325 filters the first transmit and receive signals associated with the first radio 305 with a low-pass filter (or a high-pass filter) and filters the second transmit and receive signals associated with the second radio 310 with a high-pass filter (or a low-pass filter). Diplexers provide more gradual rejection of signals compared to duplexer filters. Diplexer filters can be ceramic based and are much less costly than duplexers.

While a diplexer such as the diplexer 325 works fine with non-intermingled frequency bands that are not too close together, such as with the cellular and PCS bands, the diplexer 325 is undesirable with intermingled frequencies such as the AWS and PCS frequencies. This is because one of the AWS frequency bands is below both PCS UL and DL bands and the other AWS frequency band is above PCS bands. Because of this problem, dual band radios with intermingled frequencies typically use two antennas. However, two antennas on one device can be undesirable due to size and weight constraints. In addition, some radio standards require two antennas in order to provide for spatial diversity of receive signals, which would the mean that the device would have four antennas.

Figure 4:
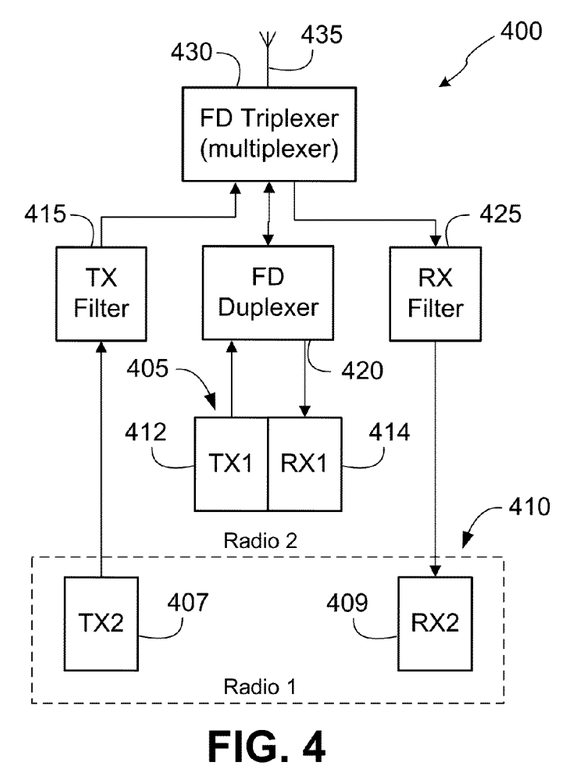
FIG. 4 is a simplified functional block diagram of a frequency division multiplexing device.

Referring to FIG. 4, an FD multiplexing device 400 for use with intermingled frequency bands includes a first radio 405, a second radio 410, an FD duplexer 420, a transmit filter 415, a receive filter 425, and a multiplexer 430. Components 405, 410, 415, 420, 425 and 430 of the multiplexing device 400 may include software executed by a processor, firmware, hardware (including manual controls), fixed logic circuitry or any combination thereof.

The frequency bands of the first radio 405 and the second radio 410 are intermingled. For example, the first radio 405 can use the PCS bands with a first UL band in the 1850 MHz to 1910 MHz range and a first DL band in the 1930 MHz to 1990 MHz range, and the second radio 410 can use the AWS bands with a first portion (here, the second UL band) in the 1710 MHz to 1755 MHz range and a second portion (here, the second DL band) in the 2110 MHz to 2155 MHz range.

Figure 5:
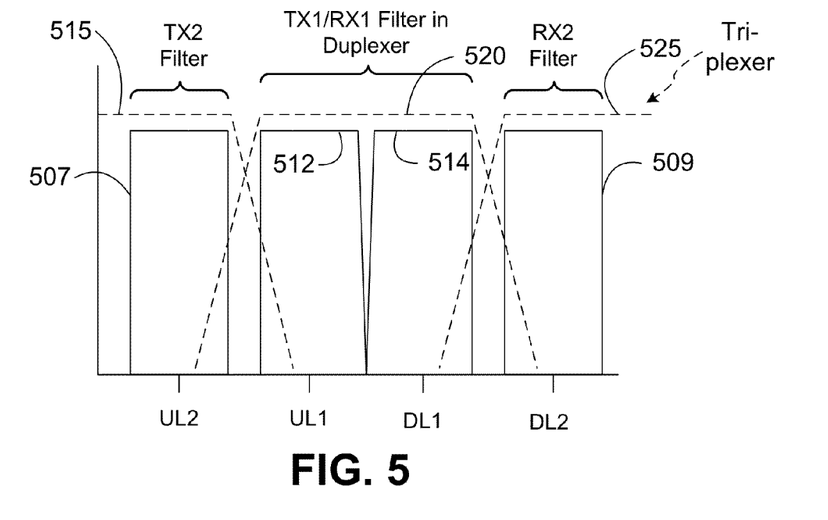
FIG. 5 is a graph of simplified frequency responses of filters used in a frequency division multiplexing device.

Referring also to FIG. 5, an example of overlaid frequency responses of the various filter components of the multiplexing device 400 are shown. The FD duplexer 420 filters a first transmit signal, in the first UL band, from a transmitter 412 of the first radio 405 with a first transmit filter profile 512 that substantially attenuates the first transmit signal outside of the first UL band (a band with a center frequency labeled UL1, and referred to herein as the UL1 band). The filtered first transmit signal is conveyed to the multiplexer 430 for transmission over the antenna 435.

The FD duplexer 420 receives a first receive signal, in the first DL band, from the multiplexer 430. The FD duplexer 420 filters the first receive signal with a first receive filter profile 514 that substantially attenuates the first receive signal at frequencies outside of the first DL band (a band with a center frequency labeled DL1 and referred to herein as the DL1 band). The filtered first receive signal is conveyed to a first receiver 414 of the first radio 405 for demodulation.

The first transmit filter profile 512 and the first receive filter profile 514 are shown ideally as band-pass filters with rectangular profiles, however actual profiles can be other shapes. The first transmit filter profile 512 can be configured to attenuate the transmit signal from the transmitter 412 outside of the UL1 band such that the amplitudes of signals at frequencies in the DL1 band, the amplitudes of signals at frequencies in a second UL band (a band with a center frequency UL2 and referred to herein as the UL2 band), and amplitudes of signals at frequencies in a second DL band (a band with a center frequency DL2 and referred to herein as the DL2 band) are attenuated from about 20 dB to about 80 dB. Similarly, the first receive filter profile 514 can be configured to attenuate the receive signals from the multiplexer 430 outside of the DL1 band such that the amplitudes of signals at frequencies in the UL1 band and amplitudes of signals at frequencies in the UL2 band and the DL2 band are attenuated from about 20 dB to about 80 dB.

The transmit filter 415 filters a second transmit signal from a second transmitter 407 of the second radio 410 with a second transmit filter profile 507 that substantially attenuates the second transmit signal at frequencies from the second transmitter 407 outside of the UL2 band. The filtered second transmit signal is conveyed to the multiplexer 430 for transmission over the antenna 435.

The receive filter 425 filters a second receive signal received from the multiplexer 430 with a second receive filter profile 509 that substantially attenuates the second receive signal at frequencies outside of the second receive band (a band with a center frequency labeled DL2 and referred to herein as the DL2 band). The filtered second receive signal is conveyed to a second receiver 409 of the second radio 410 for demodulation.

The second transmit filter profile 507 and the second receive filter profile 509 are shown as ideal band-pass filters with rectangular profiles. However, the second transmit filter profile 507 could be a low-pass filter that does not substantially attenuate signals at frequencies below the UL2 band. Similarly, the second receive filter 509 could be a high-pass filter that does not substantially attenuate signals at frequencies above the DL2 band. In either case, the second transmit and receive filter profiles 507 and 509 can be configured to attenuate the amplitudes of signal at frequencies in the UL1 and DL1 bands by about 20 dB to about 80 dB.

The multiplexer 430 includes 3 filter profiles, a low-pass filter profile 515, a band-pass filter profile 520 and a high-pass filter profile 525. The low-pass filter profile 515 is a transmit filter that filters the second transmit signal received from the transmit filter 415 and the second transmitter 407. The band-pass filter profile 520 filters both the first transmit signal received from the first FD duplexer 420 and the first receive signal received from the antenna 435. The high-pass filter profile 525 is used to filter a second receive signal received from the antenna 435 and provided to the second receiver 409.

The multiplexer 430 is communicatively coupled to the antenna 435 to receive and transmit composite signals via the antenna 435. The band-pass filter profile 520 is configured to allow signals at frequencies in a pass-band, including the UL1 and DL1 frequency bands in this embodiment, to pass substantially un-attenuated. The band-bass filter profile 520 is also configured to attenuate signals at frequencies outside of the pass-band, including portions of the DL2 and UL2 bands and beyond in this embodiment. The low-pass filter profile 515 and the high-pass filter profile 525 combine to form a band-stop filter. The band-stop filter formed by combining the filter profiles 515 and 525 is configured to attenuate signals at frequencies in at least a portion of the pass-band, including at least a portion of the UL1 and DL1 bands, and to allow signals at frequencies outside of the pass-band to pass substantially un-attenuated.

The filter profiles 515, 520 and 525 of the multiplexer 430 have less stringent attenuation requirements compared to the filter profiles 507, 509, 512 and 514 of the FD duplexer 420, the transmit filter 415 and the receive filter 425. For example, the filter profiles 515, 520 and 525 can be configured to attenuate the corresponding transmit and/or receive signals by about 10 dB to about 20 dB in the other receive and transmit frequency bands. The filters of the FD duplexer 420, the transmit filter 415 and the receive filter 425 do the majority of the filtering regarding amplitude attenuation. The multiplexer 430 performs a function allowing coupling multi-RF paths (e.g., the radio 1 UL/DL path, the radio 2 UL path, and the radio 2 DL path in this case) to a single path (e.g., an antenna port in this case) and to prevent the relatively high powered first and second transmit signals from feeding back into the receive and/or transmit circuitry. This is done by providing high impedance paths to the receive and transmit circuitry compared to the impedance of the paths to the antenna 435.

In the FD multiplexing device 400, the multiplexer 430 can be a triplexer. Other higher order multiplexers can be used to enable 3 or more radios with intermingled frequencies to transmit and receive simultaneously over a single antenna. For example, a quadriplexer could be used in combination with three radios.

Figure 6:
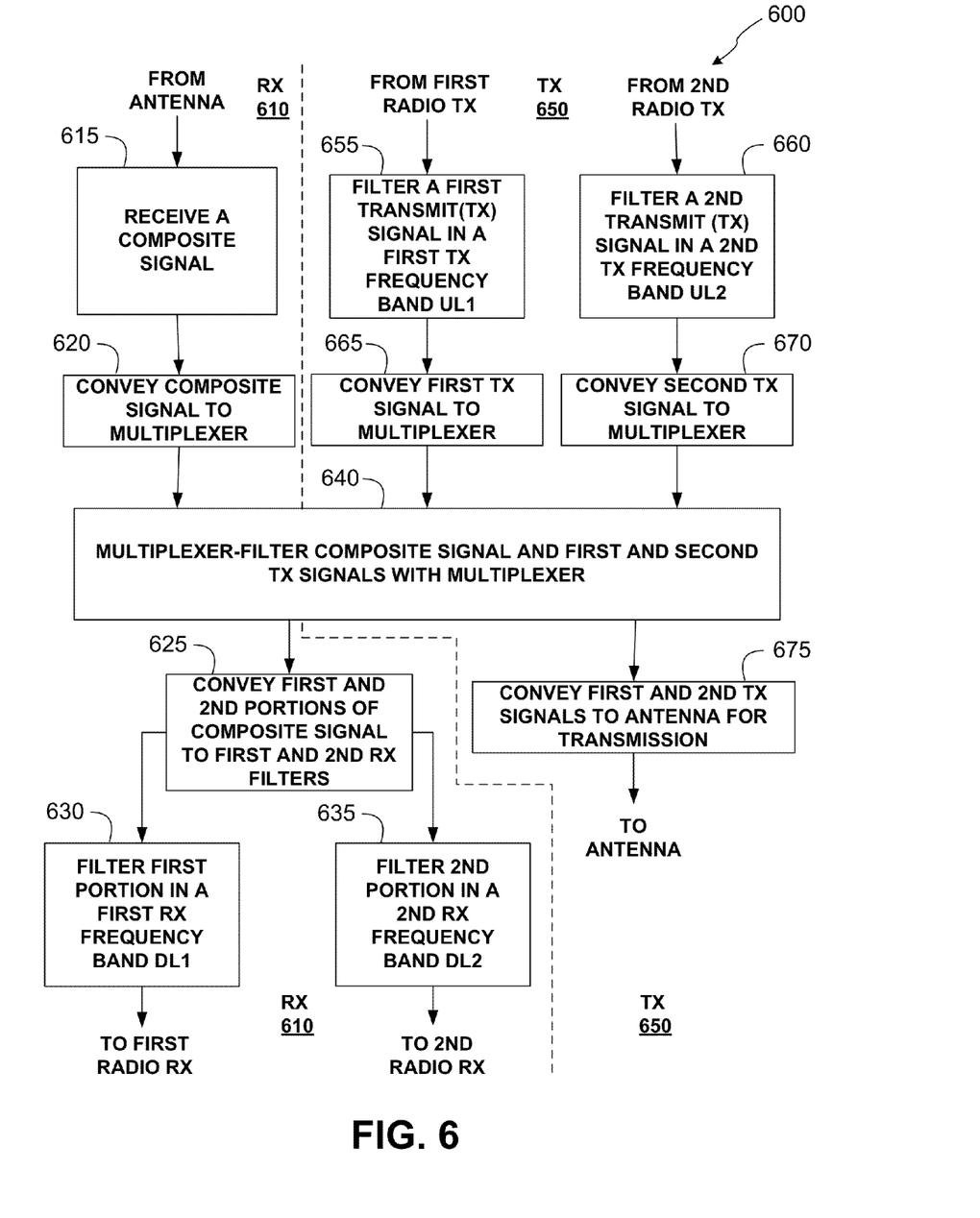
FIG. 6 is a simplified flowchart of signal processing of signals in a frequency division multiplexing device.

Referring to FIG. 6, a flowchart of a process 600 for signal processing in a frequency division multiplexing device such as the FD multiplexing device 400 includes the stages shown. The process 600 is exemplary only and not limiting. The process 600 may be modified, e.g., by adding, removing, or rearranging the stages shown.

The process 600 is divided into two main sections, a receive (RX) section 610 including stages 615-635 to the left of the dashed line in FIG. 6, and a transmit (TX) section 650 including stages 655-675 to the right of the dashed line. Stage 640 is included in both the RX section 610 and in the TX section 650 because the stage 640 includes functions that simultaneously act on both the RX and the TX signal processing sections 610 and 650, respectively. The process 600 will be described in reference to the components of FIG. 4 and the intermingled frequency bands and filter profiles of FIG. 5.

At stage 615, the antenna 435 receives a composite signal. The composite signal includes receive signals in the DL1 band and the DL2 band. At stage 620, the antenna 435 conveys the composite signal received at stage 615 to the multiplexer 430 via an input port (not shown).

At stage 640, the multiplexer 430 filters the received composite signal using the filter profiles 515, 520 and 525 discussed above. The filter profile 520, a band-pass filter, is used to filter the composite signal to isolate the UL1 and DL1 bands by at least partially attenuating signals at the frequencies in the UL2 and DL2 bands. The filter profiles 515 and 525, which together form a band-stop filter, filter the composite signal to isolate the UL2 and DL2 bands by at least partially attenuating signals in the UL1 and the DL1 bands. The filtered composite signals including the DL1 and DL2 bands are conveyed to the first receive filter included in the FD duplexer 420 and to the second receive filter 425, respectively, at stage 625.

At stage 630, the first receive filter of the FD duplexer 420 filters the portion of the filtered composite signal including the first receive signal in the DL1 band using the first receive filter profile 514. The first receive filter profile 514 further attenuates signals at frequencies outside of the DL1 band to further isolate the first receive signal in the DL1 band. The first receive filter of the FD duplexer 420 conveys the filtered first receive signal in the DL1 band to the first receiver 414 of the first radio 405 to be demodulated. In some embodiments, the first receive filter can be a separate filter that is not part of the FD duplexer 420.

At stage 635, the second receive filter 425 filters the portion of the filtered composite signal including the DL2 band using the second receive filter profile 509. The second receive filter profile 509 further attenuates signals at frequencies outside of the DL2 band to further isolate the second receive signal in the DL2 band. The second receive filter 425 conveys the filtered second receive signal to the second receiver 409 of the second radio 410 for demodulation. Upon completing the filtering at stages 630 and 635, the first and second filtered receive signals are conveyed to the first radio 405 and the second radio 410, respectively, for demodulation.

At stage 655, the first transmit filter of the FD duplexer 420 receives a first transmit signal in the UL1 band from the first transmitter 412 of the first radio 405. The first transmit filter of the FD duplexer 420 filters the first transmit signal with the first transmit filter profile 512 to attenuate signals at frequencies outside of the UL1 band. At stage 665, the first transmit filter of the FD duplexer 420 conveys the filtered first transmit signal to the multiplexer 430 for transmission via the antenna 435.

At stage 660, the second transmit filter 415 receives a second transmit signal in the UL2 band from the second transmitter 407 of the second radio 410. The second transmit filter 415 filters the second transmit signal with the second transmit filter profile 507 to attenuate signals at frequencies outside of the UL2 band. At stage 670, the second transmit filter 415 conveys the filtered second transmit signal to the multiplexer 430 for transmission via the antenna 435.

At stage 640, the multiplexer 430 filters the first and second transmit signals in the UL1 and UL2 bands using the filter profiles 515, 520 and 525 discussed above. The filter profile 520, a band-pass filter, filters the first transmit signal in the UL1 band to attenuate signals at frequencies outside of the pass-band. The filter profiles 515 and 525, forming a band-stop filter, are used to filter the second transmit signal in the UL2 band. The multiplexer 430 combines the filtered first and second transmit signals to form a composite transmit signal including the first transmit signal in the UL1 band and the second transmit signal in the UL2 band. The filtered composite transmit signal is conveyed to the antenna 435 for transmission at stage 675.

Figure 7:
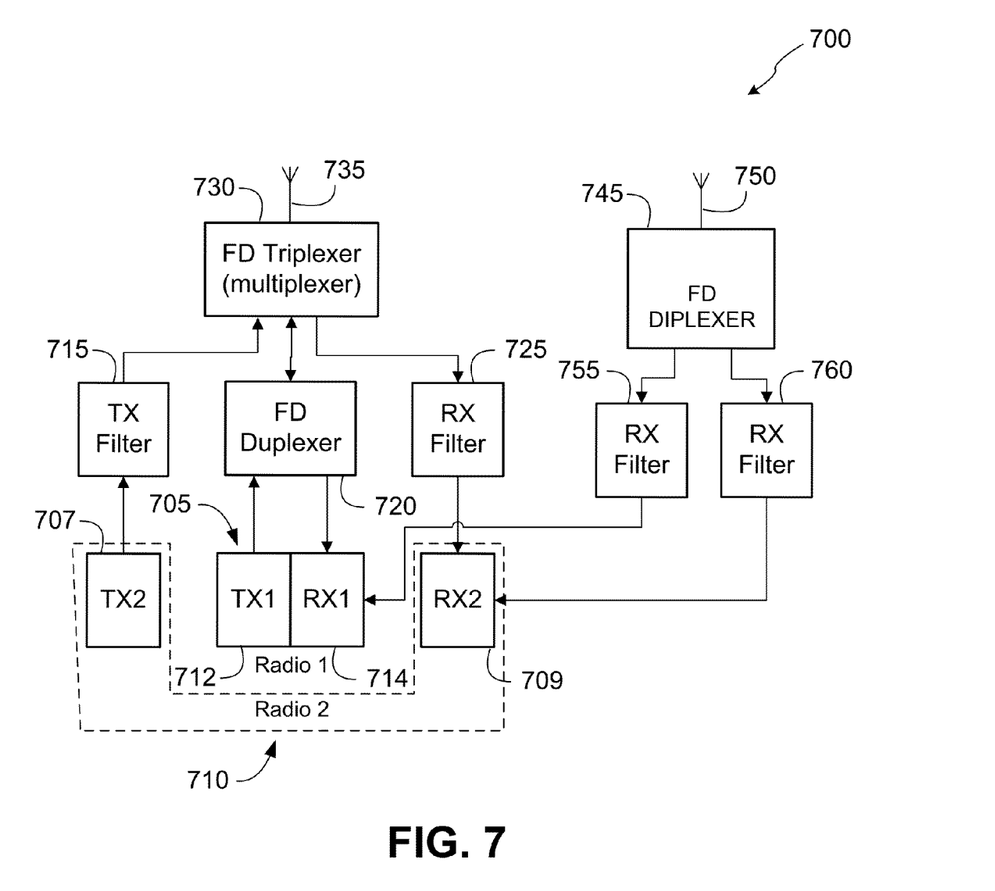
FIG. 7 is a simplified functional block diagram of yet another frequency division multiplexing device.

Referring to FIG. 7, an FD multiplexing device 700 for use with intermingled frequency bands includes a first radio 705, a second radio 710, an FD duplexer filter 720, a transmit filter 715, a receive filter 725, a multiplexer 730 and an FD Diplexer 745. The FD Diplexer 745 is coupled to a spatially diverse antenna 750 that is spaced apart from the antenna 735. Components 705, 710, 715, 720, 725, 730, 745 and 750 of the multiplexing device 700 may include software executed by a processor, firmware, hardware (including manual controls), fixed logic circuitry or any combination thereof.

The components 705, 710, 715, 720, 725, 730 and 735 are similar to the components 405, 410, 415, 420, 425, 430 and 435 of the FD multiplexing device 400 discussed above in reference to FIG. 4. The spatially diverse antenna 750 is a receive only antenna that provides improved receive performance by allowing the first and second receivers 714 and 709, respectively, to combine spatially diverse received signals with the signals received via the antenna 735.

The FD diplexer 745 can be an inexpensive ceramic filter package configured to provide a high-pass/low-pass filter for isolating the receive signals in the DL1 and DL2 frequency bands. The FD diplexer 745 is coupled to first and second receive filters 755 and 760, respectively. The receive filters 755 and 760 have profiles similar to the receive filter 425 and the receive filter contained in the multiplexer 430 (see the filter profile 514 in FIG. 5). The receive filters 755 and 760 can be SAW and/or FBAR filters. The first receive filter 755 isolates the first receive signal in the DL1 band from the second receive signal in the DL2 band, and the second receive filter 760 isolates the second signal in the DL2 band from the first receive signal in the DL1 band. The first receive filter 755 conveys the filtered signal in the DL1 band to the first receiver 714 of the first radio 705 and the second receive filter 760 conveys the second receive signal in the DL2 band to the second receiver 709 of the second radio 710. The receivers 714 and 709 combine the filtered spatially diverse signals with the signals received with the multiplexer 730.

Figure 8:
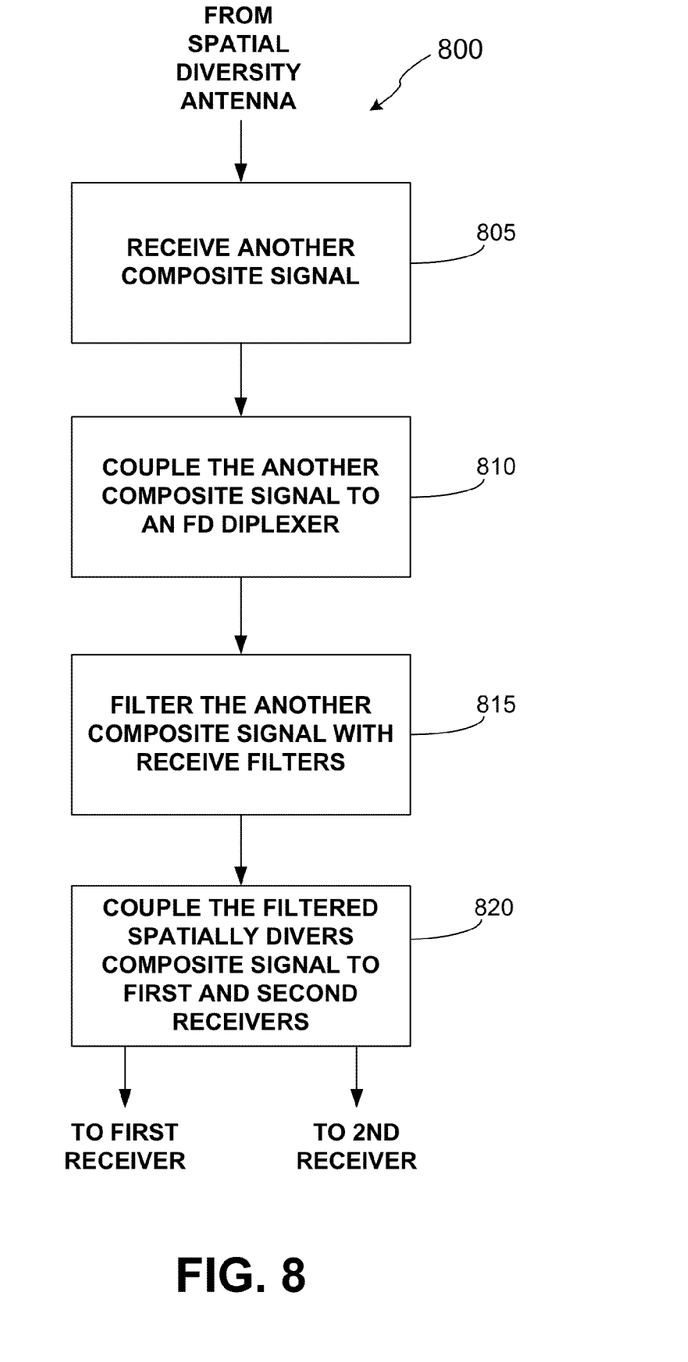
FIG. 8 is a simplified flowchart of signal processing spatially diverse receive signals in a frequency division multiplexing device.

Referring to FIG. 8, a flowchart of a process 800 for signal processing in a frequency division multiplexing device such as the FD multiplexing device 700 includes the stages shown. The process 800 is exemplary only and not limiting. The process 800 may be modified, e.g., by adding, removing, or rearranging the stages shown.

The process 600 discussed above can be used by the FD multiplexing device 700 in processing the signals received and transmitted via the antenna 735. The process 800 is used to process the signals received via the spatially diverse antenna 750.

At stage 805, the spatially diverse antenna 750 receives another composite signal that is spatially diverse from the composite signal received via the antenna 735. At stage 810, the spatially diverse composite signal is conveyed to the FD diplexer 745. At stage 815, the first receive filter 755 filters the spatially diverse composite signal to isolate a spatially diverse first receive signal in the DL1 band and the second receive filter 760 filters the spatially diverse composite signal to isolate a spatially diverse second receive signal in the DL2 band. At stage 820, the filtered spatially diverse first and second receive signals in the DL1 and DL2 bands, respectively, are conveyed to the first and second receivers 714 and 709, respectively. The first and second receivers 714 and 709, respectively, demodulate the spatially diverse receive signals in the DL1 and the DL2 bands and combine the demodulated signals with the first and second receive signals. Known methods of combining the spatially diverse signals with the signals received via the antenna 735 include coherent combining and/or maximal ratio combining The methodologies described herein may be implemented by various means depending upon the application. For example, these methodologies may be implemented in hardware, firmware, software executed by a processor, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored or otherwise encoded in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

In one or more exemplary embodiments, the functions described may be implemented in hardware, software executed by a processor, firmware, or any combination thereof. If implemented in software, the functions may be stored as one or more instructions or code on a computer-readable medium. Computer-readable media includes physical computer storage media. Transmission media includes physical transmission media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the scope of the disclosure. Thus, the disclosure is not limited to the embodiments shown herein but is to be accorded the widest scope consistent with the principles and novel features disclosed herein.

The invention claimed is:

1. A frequency division (FD) multiplexing device comprising:
    a multiplexer comprising a band-pass filter and a band-stop filter, the multiplexer being configured to be communicatively coupled to an antenna, the band-pass filter being configured to allow signals at frequencies in a pass-band to pass un-attenuated and to attenuate signals at frequencies outside of the pass-band, the band-stop filter being configured to attenuate signals at frequencies in at least a portion of the pass-band and to allow frequencies outside of the pass-band to pass un-attenuated;
    first and second receive filters communicatively coupled to the multiplexer to receive a first receive signal in a first receive band and receive a second receive signal in a second receive band different than the first receive band, the first and second receive filters configured to attenuate signals at frequencies outside of the first and second receive bands, respectively; and
    first and second transmit filters communicatively coupled to the multiplexer and configured to filter a first transmit signal in a first transmit band to attenuate signals at frequencies outside of the first transmit band, and to filter a second transmit signal in a second transmit band different than the first transmit band to attenuate signals at frequencies outside of the second transmit band, and to couple the first and second filtered transmit signals to the multiplexer such that the first and second transmit signals will be transmitted via the antenna;
    wherein at least one of the first receive band and the first transmit band are located in the pass-band and intermingled between the second receive band and the second transmit band.

2. The FD multiplexing device of claim 1 wherein the first transmit filter and the first receive filter are included in a duplexer.

3. The FD multiplexing device of claim 2 wherein the first receive band and the first transmit band are within the pass-band of the band-pass filter of the multiplexer.

4. The FD multiplexing device of claim 1 further comprising:
    first and second transmitters communicatively coupled to the first and second transmit filters and configured to couple the first and second transmit signals to the first and second transmit filters, respectively; and
    first and second receivers communicatively coupled to the first and second receive filters and configured to receive the first and second filtered receive signals from the first and second receive filters, respectively.

5. The FD multiplexing device of claim 4, further comprising:
    an FD diplexer coupled to a spatial diversity antenna spaced apart from the antenna; and
    third and fourth receive filters coupled to the FD diplexer, the third and fourth receive filters configured to receive spatially diverse versions of the first and second receive signals from the spatial diversity antenna, attenuate signals at frequencies outside of the first and second receive bands, respectively, and couple the filtered spatially diverse versions of the first and second receive signals to the first and second receivers, respectively.

6. The FD multiplexing device of claim 1, wherein the first and second receive filters and the first and second transmit filters are band-pass filters.

7. A method of frequency division (FD) multiplexing comprising:
    receiving a composite signal via a first input, the first input being configured to be communicatively coupled to an antenna;
    filtering a first transmit signal in a first transmit band to attenuate signals at frequencies outside of the first transmit band;
    filtering a second transmit signal in a second transmit band different than the first transmit band to attenuate signals at frequencies outside of the second transmit band;
    coupling the composite signal and the first and second filtered transmit signals to a multiplexer;
    multiplexer-filtering the composite signal and the first and second filtered transmit signals with the multiplexer, the multiplexer-filtering comprising:
        band-pass filtering to allow frequencies in a pass band to pass un-attenuated and to attenuate signals at frequencies outside of the pass-band, and
        band-stop filtering to attenuate signals at frequencies in at least a portion of the pass-band and to allow frequencies outside of the pass-band to pass un-attenuated;
    coupling the multiplexer-filtered first and second transmit signals to an output such that the first and second transmit signals will be transmitted via the antenna;
    coupling a first portion of the multiplexer filtered composite signal to a first receive filter, the first portion comprising a first receive signal in a first receive band, the first receive filter configured to attenuate signals at frequencies outside of the first receive band; and
    coupling a second portion of the multiplexer filtered composite signal to a second receive filter, the second portion comprising a second receive signal in a second receive band different than the first receive band, the second receive filter configured to attenuate signals at frequencies outside of the second receive band;
    wherein at least one of the first receive band and the first transmit band are located in the pass-band and intermingled between the second receive band and the second transmit band.

8. The method of claim 7 wherein the first transmit filter and the first receive filter are included in a duplexer.

9. The method of claim 7 wherein the first receive band and the first transmit band are within the pass-band.

10. The method of claim 7 further comprising:
    receiving the first transmit signal with the first transmit filter from a first transmitter;
    receiving the second transmit signal with the second transmit filter from a second transmitter distinct from the first transmitter;
    coupling the first receive signal from the first receive filter to a first receiver after filtering with the first receive filter; and coupling the second receive signal from the second receive filter to a second receiver after filtering with the second receive filter.

11. The method of claim 10 further comprising:
receiving another composite signal via a second input, the second input being configured to be communicatively coupled to a spatial diversity antenna spaced apart from the antenna;
coupling the another composite signal to an FD diplexer, the FD diplexer including third and fourth receive filters;
filtering the another composite signal with the third and fourth receive filters to attenuate signals at frequencies outside of the first and second receive bands, respectively; and
coupling the filtered signals in the first and second receive bands to the first and second receivers, respectively.

12. The method of claim 7 wherein the first and second receive filters and the first and second transmit filters are band-pass filters.

13. The method of claim 7 further comprising:
filtering the first portion with the first receive filter; and
filtering the second portion with the second receive filter.

14. An apparatus for frequency division (FD) multiplexing, the apparatus comprising:
means for receiving a signal from an antenna;
first transmit filter means for filtering a first transmit signal in a first transmit band to attenuate signals at frequencies outside of the first transmit band;
second transmit filter means for filtering a second transmit signal in a second transmit band different than the first transmit band to attenuate signals at frequencies outside of the second transmit band;
multiplexing filter means for filtering a composite signal received from the antenna, and for filtering the first and second filtered transmit signals such that the first and second transmit signals will be transmitted via the antenna, the multiplexing filter means comprising:
band-pass filter means for allowing frequencies in a pass band to pass un-attenuated and for attenuating frequencies outside of the pass-band, and
band-stop filter means for attenuating frequencies in at least a portion of the pass-band and to allow frequencies outside of the pass-band to pass un-attenuated;
first receive filter means for filtering a first portion of the multiplexing filtered composite signal, the first portion comprising a first receive signal in a first receive band, the first receive filter means configured to attenuate signals at frequencies outside of the first receive band; and
second receive filter means for filtering a second portion of the multiplexing filtered composite signal, the second portion comprising a second receive signal in a second receive band different than the first receive band, the second receive filter means configured to attenuate signals at frequencies outside of the second receive band;
wherein at least one of the first receive band and the first transmit band are located in the pass-band and intermingled between the second receive band and the second transmit band.

15. The apparatus of claim 14 wherein the receiving means comprises an input.

16. The apparatus of claim 14 wherein each of the first and second transmit filter means comprises at least one of a band-pass filter, a low-pass filter or a high-pass filter.

17. The apparatus of claim 14 wherein the multiplexing filter means comprises a triplexer.

18. The apparatus of claim 14 wherein each of the first and second receive filter means comprises at least one of a band-pass filter, a low-pass filter or a high-pass filter.

19. The apparatus of claim 14 wherein the first and second receive filter means couple the first and second portions to first and second receivers, respectively, the apparatus further comprising:
means for receiving another composite signal via a spatial diversity antenna spaced apart from the antenna;
means for filtering the another composite signal to attenuate signals at frequencies outside of the first and second receive bands; and
means for coupling the filtered signals in the first and second receive bands to the first and second receivers, respectively.

20. A computer program product comprising:
a processor-readable medium storing processor-readable instructions configured to cause a processor to:
receive a composite signal;
filter a first transmit signal in a first transmit band to attenuate signals at frequencies outside of the first transmit band;
filter a second transmit signal in a second transmit band different than the first transmit band to attenuate signals at frequencies outside of the second transmit band;
multiplexer-filter the composite signal and the first and second filtered transmit signals with a multiplexer, the multiplexer configured to:
band-pass filter to allow signals at frequencies of a pass band to pass un-attenuated and to attenuate signals at frequencies outside of the pass-band, and
band-stop filter to attenuate signals at frequencies in at least a portion of the stop-band and to allow signals at frequencies outside of the stop-band to pass un-attenuated;
convey the multiplexer-filtered first and second transmit signals to an output such that the first and second transmit signals will be transmitted via the antenna;
convey a first portion of the multiplexer filtered composite signal to a first receive filter, the first portion comprising a first receive signal in a first receive band, the first receive filter configured to attenuate signals at frequencies outside of the first receive band; and
convey a second portion of the multiplexer filtered composite signal to a second receive filter, the second portion comprising a second receive signal in a second receive band different than the first receive band, the second receive filter configured to attenuate signals at frequencies outside of the second receive band;
wherein at least one of the first receive band and the first transmit band are located in the pass-band and intermingled between the second receive band and the second transmit band.

21. The computer program product of claim 20 wherein the first receive band and the first transmit band are within the pass-band of multiplexer.

22. The computer program product of claim 20 wherein the instructions are configured to cause the processor to:
receive the first transmit signal from a first transmitter;
receive the second transmit signal from a second transmitter distinct from the first transmitter;
convey the first receive signal to a first receiver after filtering with the first receive filter; and
convey the second receive signal from the second receive filter to a second receiver after filtering with the second receive filter.

23. The computer program product of claim 22 wherein the instructions are configured to cause the processor to:
   receive a spatially diverse composite signal corresponding to the composite signal;
   filter the spatially diverse composite signal with third and fourth receive filters to attenuate frequencies outside of the first and second receive bands; and
   convey the filtered spatially diverse signals in the first and second receive bands to the first and second receivers, respectively.

24. The computer program product of claim 20 wherein the first and second receive filters and the first and second transmit filters are band-pass filters.

25. The computer program product of claim 20 wherein the instructions are configured to cause the processor to:
   filter the first portion with the first receive filter; and
   filter the second portion with the second receive filter.

* * * * *